July 4, 1950  G. B. COE  2,513,285
DIE SHAPING MACHINE
Filed Jan. 15, 1949  6 Sheets-Sheet 1

Fig. 1.

INVENTOR
GEORGE B. COE
BY
Emery, Varney, Whittemore & Dix
ATTORNEYS

Fig. 2.

July 4, 1950  G. B. COE  2,513,285
DIE SHAPING MACHINE
Filed Jan. 15, 1949                                              6 Sheets-Sheet 4

INVENTOR
GEORGE B. COE
BY
ATTORNEYS

July 4, 1950  G. B. COE  2,513,285
DIE SHAPING MACHINE

Filed Jan. 15, 1949  6 Sheets-Sheet 5

INVENTOR
GEORGE B. COE
BY
Emery, Varney, Whittemore & Dix
ATTORNEYS

Patented July 4, 1950

2,513,285

UNITED STATES PATENT OFFICE 2,513,285

DIE-SHAPING MACHINE

George B. Coe, Upper Montclair, N. J., assignor, by mesne assignments, to Tube Reducing Corporation, Stamford, Conn., a corporation of Delaware Application January 15, 1949, Serial No. 71,148

11 Claims. (Cl. 82—14)

This invention relates to improvements in machines for cutting and finishing the cavities in dies and, more particularly, the cavities or grooves in the peripheries of co-operating pairs of die-rolls or rockers used in mills for the cold reduction of metal tubes, rods and other metal stock.

In my earlier Letters Patent No. 2,040,361 issued May 12, 1936, I have disclosed a die-shaping machine for cutting and finishing such cavities or grooves; and the object of my present invention is to improve that machine in several particulars, as will appear hereinafter, in order to make it more convenient to operate as well as to reduce the time required to cut and finish a pair of dies thereon, and in general improve its operation and increase its efficiency and utility.

In the accompanying drawings.

In the present case, as in the case of my earlier Letters Patent to which I have referred, the peripheral grooves in a pair of cooperating dies are shaped simultaneously by securing the two work-pieces 20 respectively to spindles 21 carried by a rotating work-holder 22 so that the rotation of the latter will cause the work-pieces to have an orbital movement around a cutter 23 as a center, while at the same time the spindles themselves turn about their own axes to feed the peripheries of the work-pieces past the cutter. Also, as in my earlier machine, the cutter is securely mounted in a holder fastened to a table 24, the latter being supported on a slide 25 which, through a handwheel 26 and with the aid of a micrometer dial 27, is accurately adjustable along an underlying laterally movable slide 25', whereby the cutter at the beginning of each successive cut may be accurately positioned with respect to the slide 25' to gage the amount or degree of cutting to be effected by each cut. And again, as in my earlier machine, the slide 25' is provided with an arm 28 rigidly secured thereto and carrying a roller 29 which engages a pattern-controlling cam 30 mounted on a longitudinally movable slide 30' whereby, during each cutting, the cutter is automatically given a lateral movement to shape the contour of the grooves to be cut, that is, to provide a straight or tapered contour or one straight in some portions and tapered in others. The longitudinal movement of the cam supporting slide 30', the rotation of the work-holder, and the turning of the spindles are effected by connections therefrom to a single motor 31; and since, as in my earlier Letters Patent, the work-pieces, after each cutting operation, are to be successively returned to their starting positions for further cuts until the cutting of the grooves has been completed, the motor 31 is of the reversing type.

Figure 2:
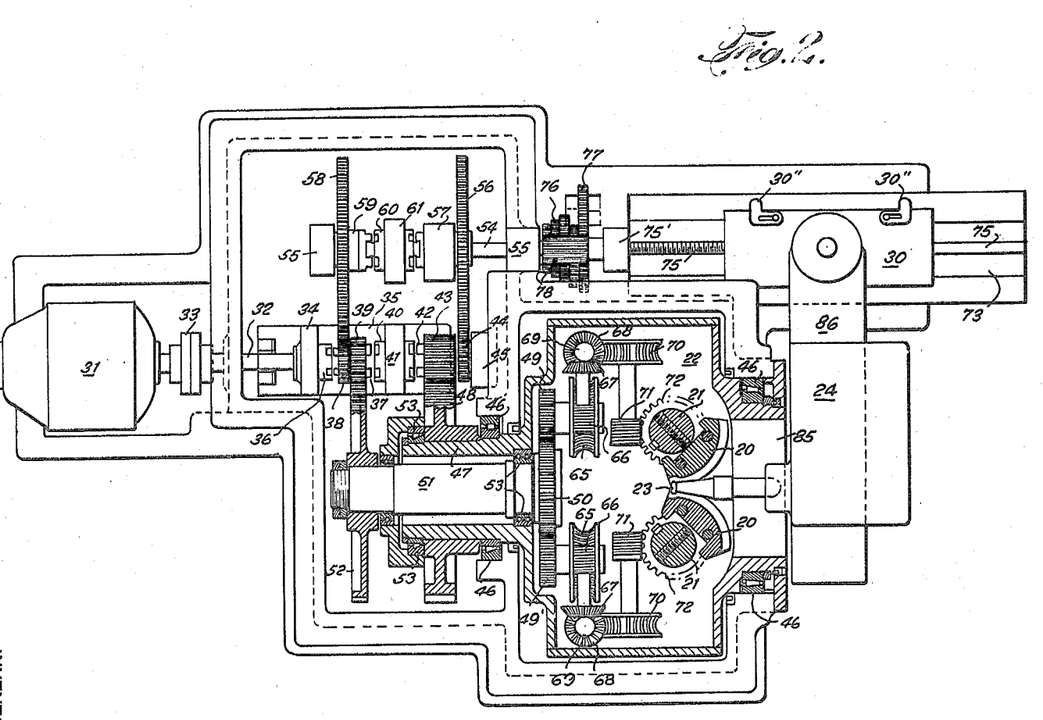
Fig. 2, a plan view of a horizontal section taken on a plane indicated by the line 2—2 of Fig. 1.

Referring now more particularly to Fig. 2 of the accompanying drawings, the main shaft 32 of the machine, which is driven by the motor 31 through a coupling 33, extends freely through a bearing 34 rigidly attached to a longitudinally slidable member 35 which is supported and guided in the frame of the machine, thence freely through a stationary clutch member 36 fast on bearing 34, thence freely through a clutch member 37 to which pinions 38 and 39 are rigidly secured, thence through a clutch member 40 which is keyed to said shaft and rotatable within a shifting-ring 41, thence freely through a clutch member 42 to which pinions 43 and 44 are rigidly secured, and finally into its forward bearing 45 attached to the frame of the machine.

The spindles 21 aforesaid to which the pair of work-pieces 20 are respectively secured in proper relation for being operated upon conjointly by the cutter 23, are carried by and within a casing or spindle-box 22 (heretofore referred to as the work-holder) and the latter is mounted for rotation in the frame of the machine as indicated by anti-friction bearings 46. These bearings, firmly supporting, as they do, on the frame of the machine both ends of the spindle-box, prevent any deflection of the latter such as might occur if the spindle-box with its associated gearing and work-pieces overhung its support as in my earlier machine. Fast on the rear spindle-box journal 47 is a gear 48 which meshes with the aforesaid pinion 43 for imparting rotation to the spindle-box. The turning of the spindles 21 about their respective axes is effected by gearing within the spindle-box to be described presently, such gearing including two planetary pinions 49 and 49' each meshing with a sun gear 50 fast on the forward end of a short auxiliary shaft 51 mounted for rotation within and co-axial with spindle-box journal 47 and provided with anti-friction bearings 53. The rear end of this auxiliary shaft is keyed to a gear 52 which meshes with the aforesaid pinion 39.

Figure 8:
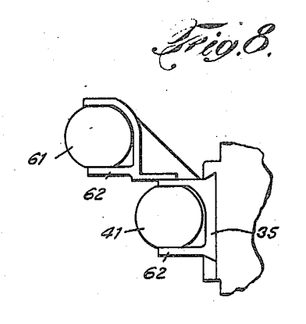

For imparting the longitudinal movement to the cam-supporting slide 30', to which reference has already been made, so that as the cutting of the grooves progresses through the rotation of the spindle-box, a lateral movement will at the same time be imparted to the cutter to shape the contour of the grooves in accordance with the pattern of the cam, a counter-shaft 54 is journaled in bearings 55 on the frame of the machine and provided with operative connections to said cam which will be described in detail hereinafter. Freely mounted on this counter-shaft is a gear 56 meshing with the aforesaid pinion 44 and having a clutch member 57 rigidly secured thereto, and also, similarly mounted thereon, another gear 58 which meshes with the aforesaid pinion 38 and has a clutch member 59 rigidly secured thereto. Between these two clutch members 57 and 59, a clutch member 60 rotatable within a shifting-ring 61 is keyed to said countershaft whereby it may be moved in either direction along the counter-shaft to engage one or the other of the clutch members 57 and 59. Said shifting-ring 61 and the aforesaid shifting-ring 41 are both trunnion-supported in a bracket 62 (Fig. 8) which is rigidly secured to the aforesaid longitudinal slide 35 to which, as already noted, the aforesaid stationary clutch 36 and bearing 34 are also secured.

Figure 6:
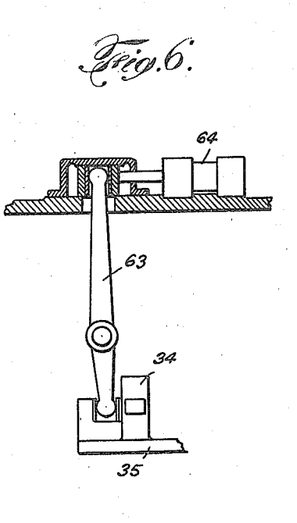
Figs. 6, 7 and 8, detail views.
Figure 7:
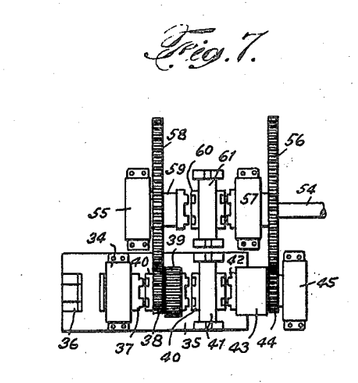

Through a lever 63 (Fig. 6) pivoted to the frame of the machine, and one arm of which, for actuation, is operatively connected to the piston of a fluid pressure cylinder 64 mounted on the top of the machine (Fig. 1) while the other arm is connected to the aforesaid longitudinal slide 35, the latter may be shifted forward or backward, carrying with it the bearing 34 with its attached clutch member 36 together with the bracket 62 with its attached shifting-rings 41 and 61 of the respective clutch members 40 and 60.

When the slide 35 is in its middle or neutral position (shown in Fig. 2), the machine will be idle since no movement will be imparted by the motor 31 to the spindles 21 or to the spindle-box 22 or to the cam slide 30'. When, however, the slide 35 is moved forward (to the right in Fig. 2) so that the stationary clutch member 36 engages the freely mounted clutch member 37, the clutch members 40 and 60 will also be shifted to engage respectively the clutch members 42 and 57, and in this position the short shaft 51 and the sun gear 50 attached thereto will be locked stationary through the pinion 39 and gear 52, while motion will be imparted through the pinion 43 and gear 48 to rotate the spindle-box, thus causing the planetary pinions 49 and 49' to traverse the now stationary sun gear 50 and, through pinion 44 and gear 56, to move the cam slide 30'. When the motor is run with the slide 35 in this position, a cutting operation will be effected along the peripheries of the work-pieces.

Each successive cut needed to complete the grooves in the work-pieces requires the spindles to be turned back to their starting positions to begin a fresh cut. This is effected by reversing the motor after the slide 35 has been moved backward to a position where the slidable clutch members 40 and 60, now free of engagement with clutch members 42 and 57, are brought into engagement respectively with the clutch members 37 and 59 and where the clutch member 37 is now free of engagement with the stationary clutch member 36. When said slide has been moved to this position, the gear 52 in mesh with the pinion 39 will cause the short shaft 51 and its attached sun gear 50 to rotate at high speed, while the gear 48 and pinion 43 remain motionless, thus rapidly revolving the planetary pinions 49 and 49' which, through their gearing connections to the spindles 21 will quickly turn the latter with their attached work-pieces back to their starting positions for the new cut. To stop the motor automatically when the spindles and work-pieces have reached their starting positions, as well as when, at the end of a cutting operation, they have reached the limit of their cutting traverse, the cam-carrying slide 30' may be provided with fingers 30'' to engage and open switches (not shown) in the motor circuit; and said fingers may be adjustable along the slide 30' for setting them in proper positions thereon depending upon the length of the grooves to be cut in the work-pieces. Since, during each cutting operation, the reduction in the gearing between the spindles and the motor causes the spindles to turn very slowly, the mechanism just described for turning the spindles quickly back to their starting positions, saves considerable time as compared with operating in reverse precisely the same mechanism by which the spindles are slowly turned to effect the cutting, as in my earlier machine.

Figure 1:
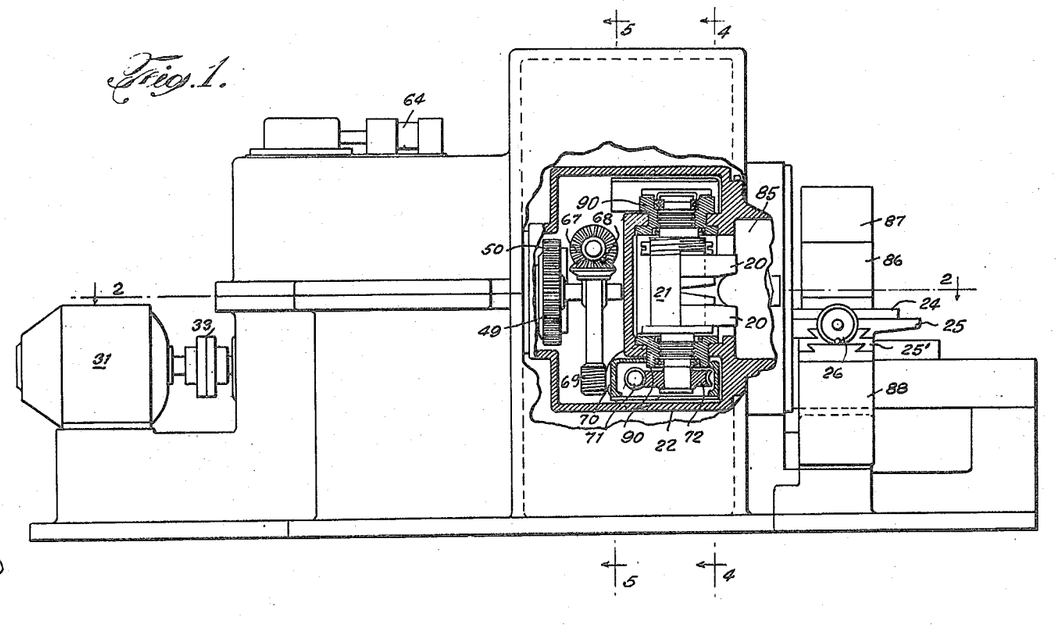
Fig. 1 is a view in side elevation of a machine in which the present improvements have been incorporated, the casing thereof being partially broken away to show the mechanism for driving the two spindles upon which the work-pieces are mounted for operation thereon.

Referring to Figs. 1 and 2, showing in detail the gearing in the rotatable spindle-box to connect the sun gear 50 with the respective spindles 21, the importance of having this gearing and the spindles and work-pieces so disposed in said box that during its rotation the box and its contents will be balanced dynamically relative to its axis of rotation, will be readily appreciated. For this purpose, there is provided a double drive from the sun gear to the spindles, said drive beginning with the planetary pinions 49, 49' and leading (as viewed from the position of the parts in Fig. 1) to the top end of one spindle and to the bottom end of the other. The two sets of gears through which this drive to the respective spindles is effected are identical in construction and symmetrically arranged in relation to the axis of the spindle-box; and each such set comprises one of the aforesaid planetary pinions, a worm-gear 65, a worm 66 meshing therewith and driving a bevel gear 67 meshing with another bevel gear 68 which turns a worm 69 meshing with a worm-gear 70; and the latter turns a worm 71 meshing with a worm-gear 72 attached in the case of one of the spindles, to its top end and, in the case of the other spindle, to its bottom end. In this manner the spindle-box is maintained permanently in perfect dynamic balance at all times irrespective of the size of the work-pieces attached to the spindles. In the machine of my earlier Letters Patent, where both of the spindles were driven from their bottom ends, a counter-weight had to be provided to secure proper balance, and such counter-weight had to be changed each time the size of the work-pieces was changed.

Referring now to the longitudinally movable slide 30' (Fig. 2) which carries the pattern-controlling cam 30, said slide is longitudinally movable along ways 73 secured to the frame of the machine, and is provided with a boss 74 (Figs. 9 and 11) on its rear end within which an interiorly threaded ring 74' is securely held; and through this ring a shaft 75 extends rotatable in a bearing 75' and having threads along an intermediate portion thereof which mesh with the threads of said ring. Rigidly fastened on the rear end of this shaft is a gear cluster 76 for operative connection, through a sliding tumbler gear 77 slidably mounted on the machine frame, to a long-faced pinion 78 fast on the forward end of the counter-shaft 54 which has already been referred to. Thus, whenever the gear 56 is rotated in the manner hereinbefore explained, the slide 30', together with the cam 30 carried thereby, is slowly fed forward; and whenever the gear 58 is rotated said slide and cam are rapidly retracted to their starting positions. By adjusting the tumbler gear in relation to the gear cluster, any desired ratio between the movement of the spindle-box and the movement of the cam may be obtained, thus obviating the necessity, which existed in my earlier machine, of removing certain parts and substituting therefor other parts of a different size whenever it was desired to change such ratio.

Figure 3:
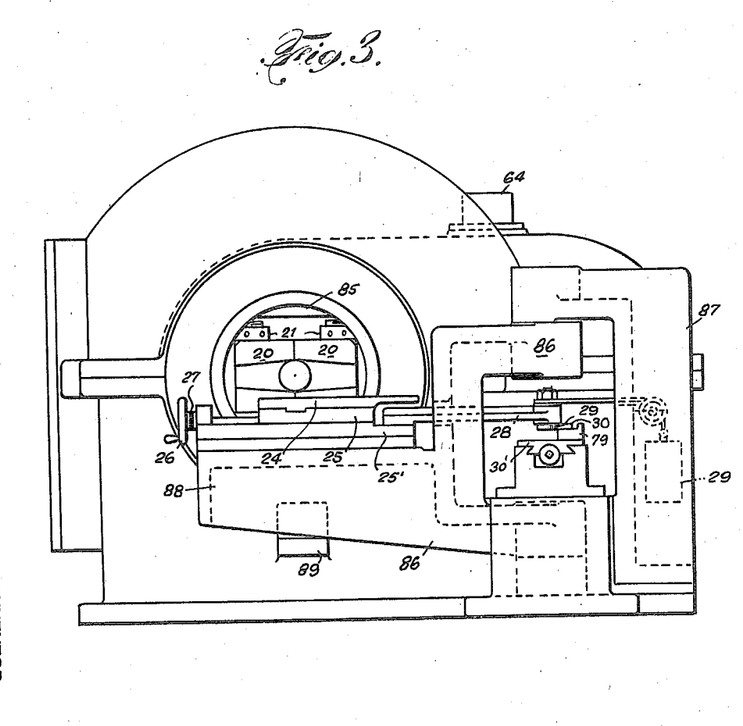
Fig. 3, a front end view.
Figures 9, 10, 11:
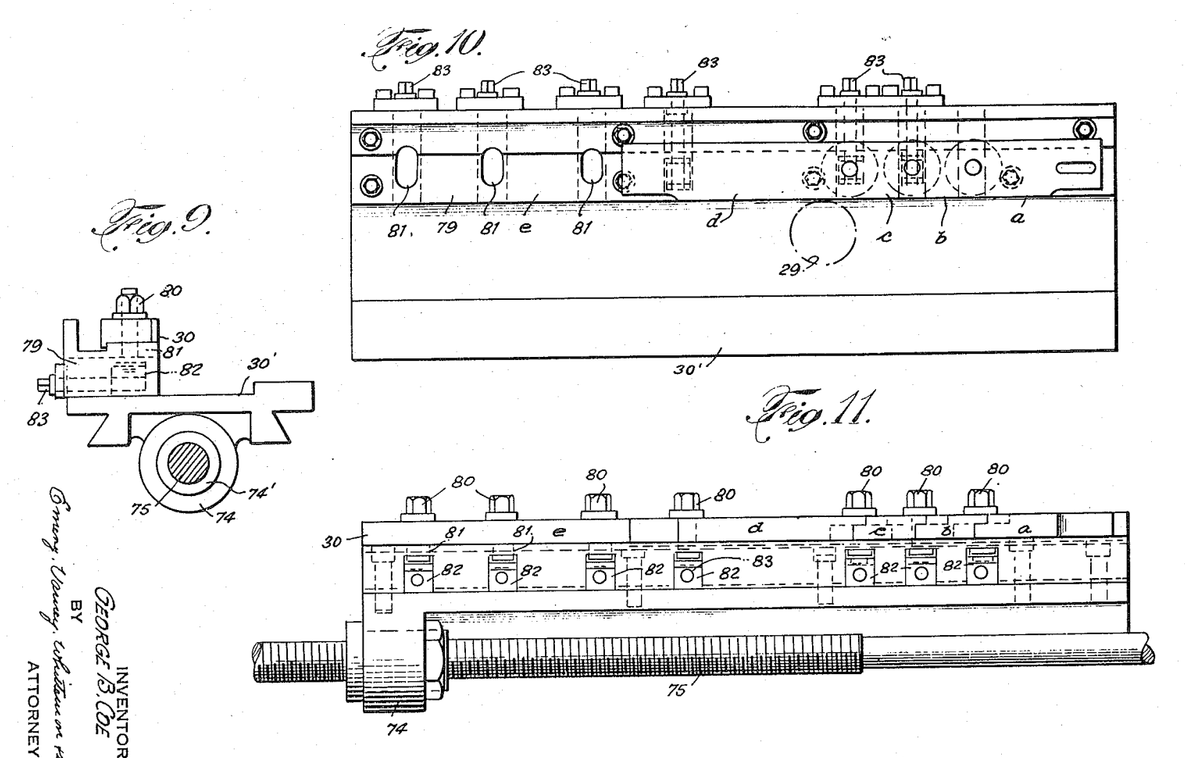
Figs. 9, 10 and 11, large scale detail views.

In the enlarged scale views of Figs. 9, 10 and 11, the construction of the cam 30 is shown in detail to illustrate how the parts or sections thereof are adjustable and maintained in position to provide the desired contour of the cam face against which the roller 29 is held, during a cutting or grinding operation, by a weight 29' (Fig. 3). Bolted to the top of the slide 30' near one edge thereof and extending substantially the entire length of said slide is a member 79 upon and along the top of which the cam 30 is secured. Said cam is made in several sections which will ordinarily be of varying lengths, and each of which is secured to said member by bolts 80 which pass through elongated slots 81 in said member and the inner ends of which engage in blocks 82 laterally slidable in said member. By loosening the nuts on the bolts 80 the lateral position of said blocks may be varied through adjusting screws 83 threaded thereto; and when the desired adjustment has been made, the blocks, together with the respective sections of the cam are rigidly maintained in their adjusted positions by tightening the nuts again on the bolts 80. As shown in Figs. 10 and 11, the cam in the present case has, for example, five sections a, b, c, d and e to adapt it particularly for providing the desired contour of the cam for shaping the peripheral grooves in the die-rolls commonly used in reducing mills of the type aforesaid. For this purpose the foremost section a of the cam, which section controls the shaping of the mouths of these grooves, is a relatively short section and may be permanently fixed in position on the member 79 since the position of that section will not ordinarily need to be adjusted. The rearmost section e of the cam is a relatively long section and controls the shaping of the straight or cylindrical ends of said grooves; and therefore this section is laterally adjustable only. The intermediate sections b, c and d control the shaping of the tapered portions of said grooves; and for this purpose the respective ends of each of these intermediate sections are made to overlap the ends of their adjacent sections, and in such case the fastening bolts 80 for these sections pass through respective pairs of said overlapping ends whereby, when the corresponding blocks 82 are slid inwardly or outwardly by their adjusting screws 83 to move these sections into the desired positions to form the cam face, the bolts 80 which pass through the ends of any such section will constitute pivots around which such section may be swung. Thus, by providing a number of straight-faced cam sections of different lengths, the cam face may be given the desired contour by the adjustments aforesaid.

For loading and unloading the work-pieces or dies, and for measuring and inspection within the spindle-box 22, an opening 85 (Figs. 1 and 2) is provided through the forward spindle-box journal; and to facilitate said loading and unloading, the table 24, and slides 25 and 25' together with their associated parts, are movable away from said opening by being mounted upon a swinging bracket 86 pivoted to a stationary bracket 87, the free end 88 of the swinging bracket, when in its normal position, being supported on and latched to a shelf 89 on the frame of the machine (Fig. 3). From this figure and Fig. 2, it will be seen that the pivotal axis of swinging bracket 86 is a vertical line passing through the dead center of cam roller 29, thus permitting said bracket to be swung outwardly from the machine without disturbing the cam 30. For adjusting the positions of the spindles 21 in the spindle-box 22, as well as for convenience in disassembling the spindles, the latter may be journaled in slidable frames 90, and the spindle-box provided on two opposite sides thereof with removable covers 91, and the machine casing with a removable cover 92 located on one side of the machine (Fig. 4); furthermore, the spindle frames may be adjustably secured respectively to the spindle-box covers 91 by means of hollow screws 93 which extend through said covers so as to be readily accessible from the exterior of the spindle-box. By removing the casing cover 92, when the parts are in the positions shown in Fig. 4, the spindle-box cover adjacent thereto may be removed and the adjacent spindle-slide with its spindle may be withdrawn from the spindle-box. Then, by giving the spindle-box a half turn, the other spindle-box cover, spindle-slide and spindle may be withdrawn. The casing cover 92 has an opening therein normally closed by a removable cap 94. When it is desired merely to adjust the positions of spindle-slides 90 or tighten the screws 95 which secure the work-pieces to the spindles, it is only necessary to remove said cap 94 whereupon a suitable tool can be readily inserted and applied to rotate each of the hollow screws 93 in turn which adjustably secure the spindle-slides in position, and similarly a wrench can be inserted through said opening and into each hollow screw in turn to engage the heads of screws 95 for tightening the work-pieces on the machine.

It will be understood that the grooves are cut in the work-pieces before the latter have been hardened; then, after being hardened, the grooves cut therein are finished by grinding. For this grinding, the cutter 23 is removed from its holder on table 24 and a grinding tool substituted in its place. The grinding tool may be connected to the shaft of and driven by an auxiliary motor (not shown) mounted on the table 24 so that the grinding tool will occupy the same position as that of the cutter shown in the drawings. The machine is then operated in the same way for the grinding as for the previous cutting.

Figure 4:
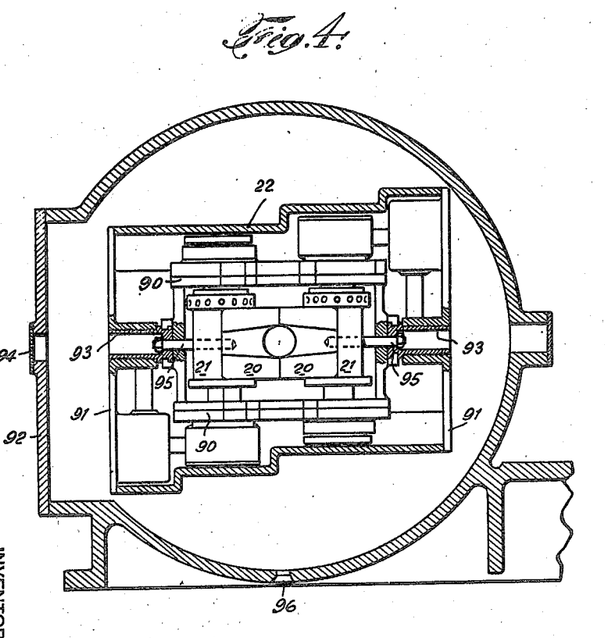
Figs. 4 and 5, transverse sections respectively on planes indicated by the lines 4—4 and 5—5 of Fig. 1.
Figure 5:
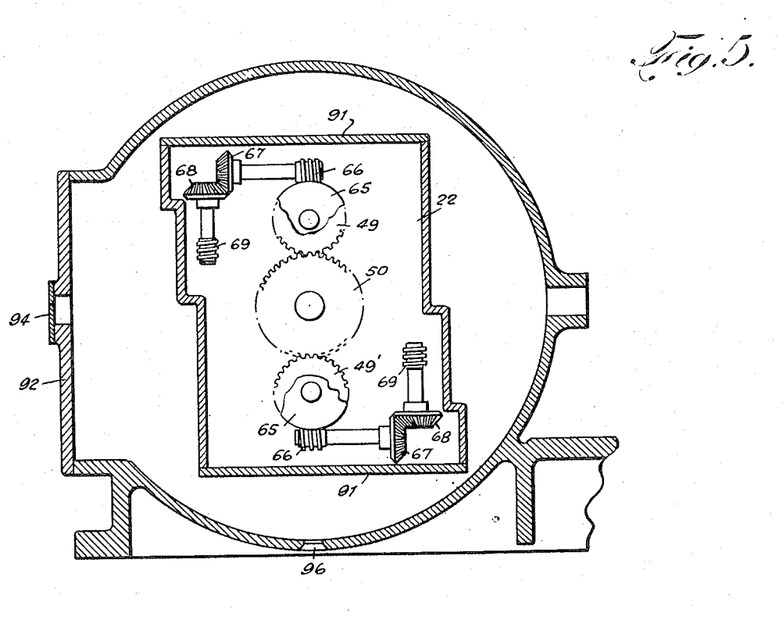

Since the present machine, unlike my original machine, is provided with a casing, it is practicable to use a lubricant or coolant both for wet-turning and wet-grinding, thereby increasing the rate of the machining and the quality of the product. The coolant or lubricant, as will be understood, may be delivered in a stream upon the cutting tool or the grinder, through piping (not shown) and will drain through perforations (not shown) in the spindle-box and collect in the bowl-like bottom of the machine casing where it may be removed through a tap 96 (Fig. 4). In my earlier machine it was not practicable to use a lubricant or coolant without spattering the same to such an extent as to make it objectionable for the operator to approach the machine close enough for inspection during its operation.

I claim as my invention:

1. In a machine of the character described, the combination of a rotatable member, spindles carried thereby to which the respective work-pieces are to be secured, a tool for operating on the work-pieces, a laterally movable table supporting the tool between the spindles, a longitudinally movable cam, a roller held against the face of the cam and pivotally supported on the laterally movable table, planetary pinions carried by said rotatable member and operatively connected to the spindles, a sun gear in mesh with the planetary pinions, a main shaft, an auxiliary shaft having its axis of rotation coincident with that of said rotatable member and to which the sun gear is rigidly secured, a counter-shaft operatively connected to the cam for imparting longitudinal movement thereto, two gears freely mounted on the counter-shaft, a pinion freely mounted on the main shaft and operatively connected to said rotatable member and to one of the gears on the counter-shaft, a second pinion freely mounted on the main shaft and operatively connected to said auxiliary shaft and to the other of said gears on the counter-shaft, and sliding clutch members keyed respectively to the main shaft and counter-shaft and connected with each other so as to be movable together along their respective shafts, whereby said clutch members may be shifted to a position where one of them is coupled to the first named pinion on the main shaft and the other simultaneously coupled to one of the gears on the counter-shaft, for effecting a tooling operation upon the work-pieces, and then shifted to a position where one of them is coupled to said second pinion on the main shaft and the other simultaneously coupled to the other gear on the counter-shaft, for effecting the return of the spindles and the retraction of the longitudinally movable slide to their respective starting positions.

2. The combination defined by claim 1 and further characterized by the provision of a longitudinally movable slide, a bracket fixed thereto, shifting-rings carried by said bracket and connected to both said clutch members, a stationary clutch member also fixed to said bracket and within which the main shaft is freely rotatable, whereby when the said clutch member on the main shaft is coupled to the first named pinion on the main shaft, said stationary clutch member will be simultaneously coupled to said second pinion on the main shaft.

3. The combination defined by claim 1 and further characterized by the provision of a longitudinal slide to which the cam is secured, a shaft threaded to that slide, a gear cluster fast on that shaft, a long-faced pinion fast to the counter-shaft, and a tumbler gear slidably mounted on the machine frame for operatively connecting said gear cluster and long-faced pinion.

4. The combination defined by claim 1 and further characterized by this: that the connections between the planetary pinions and the spindles comprise a set of driving gears operatively connecting one of the planetary pinions to the top end of one of the spindles and a like set of driving gears operatively connecting the other planetary pinion to the bottom end of the other spindle, and that said sets of gears are symmetrically disposed in relation to the rotational axis of the rotatable member so as to balance each other and keep the rotatable member at all times dynamically balanced.

5. The combination defined by claim 1 and further characterized by this: that the rotatable member comprises a box journaled at each end and enclosing the spindles, work-pieces, planetary pinions and the connections between said pinions and spindles, and that both of the box-journals are supported for rotation in bearings on the machine frame.

6. The combination defined by claim 1 and further characterized by this: that said rotatable member comprises a box having front and rear journals and enclosing the spindles, work-pieces, planetary pinions and the connection between said pinions and spindles, that said box is provided with an opening through its front journal for measuring and inspection within the box, and that a holder to which the operating tool is attached for supporting it on the laterally movable table projects through said opening so as to hold the tool in proper relation to the work-pieces on the spindles.

7. The combination defined by claim 1 and further characterized by this: that said rotatable member comprises a box having front and rear journals, that said box is provided with an opening through said front journal for loading and unloading the work-pieces, and that the laterally movable table which supports the operating tool is in turn supported on a bracket pivotally mounted on the machine so as to be swingable away from said opening on an axis passing through the dead center of the cam-roller and normally held latched to the front of the machine adjacent to said opening.

8. The combination defined by claim 1 and further characterized by this: that the spindles are journaled respectively in slidable frames, that the rotatable member comprises a box within which the slidable frames with their spindles, the work-pieces, planetary pinions and the connections between said pinions and spindles are housed, said box having on opposing sides thereof removable covers to which the slidable frames are respectively secured, whereby the slidable frames together with their spindles may be withdrawn from the box for disassembling the spindles, by simply removing the covers.

9. The combination defined by claim 1 and further characterized by this: that the spindles are journaled respectively in slidable frames, that the rotatable member comprises a box within which the slidable frames with their spindles, the work-pieces, planetary pinions and the connections between said pinions and spindles are housed, said box having on opposing sides thereof removable covers to which the slidable frames are secured respectively, and said machine being provided with a casing enclosing the spindle-box and having a removable cover on one side of the machine, whereby by removing that cover the adjacent spindle-box cover may be withdrawn from the spindle-box together with its attached spindle frame and then, by giving the box a half turn the other spindle-box cover may be withdrawn together with its attached spindle frame.

10. The combination defined by claim 1 and further characterized by this: that the spindles are journaled respectively in slidable frames, that the rotatable member comprises a box within which the slidable frames with their spindles, the work-pieces, planetary pinions and the connections between said pinions and spindles are housed, said box having on opposing sides thereof removable covers, hollow screws extending through said covers for adjustably securing the spindle frames respectively to said covers, and fastening screws for securing the work-pieces to the spindles and the heads of which fastening screws lie within said hollow screws, whereby without removing said covers the respective positions of the spindle frames in the spindle-box may be adjusted and said fastening screws tightened.

11. The combination defined by claim 1 and further characterized by this: that the spindles are journaled respectively in slidable frames, that the rotatable member comprises a box within which the slidable frames with their spindles, the work-pieces, planetary pinions and the connections between said pinions and spindles are housed, said box having on opposing sides thereof removable covers, hollow screws extending through said covers for adjustably securing the spindle frames respectively to said covers, and fastening screws for securing the work-pieces to the spindles and the heads of which lie within said hollow screws, and said machine being provided with a casing enclosing the spindle-box and having an opening in such position relative to the spindle-box that suitable tools may be inserted therethrough to engage respectively said hollow screws and said fastening screws in order to adjust the position of the spindle frames in the spindle-box and tighten the work-pieces on the spindles.

GEORGE B. COE.

No references cited.